(12) United States Patent
Blake et al.

(10) Patent No.: US 6,707,850 B1
(45) Date of Patent: Mar. 16, 2004

(54) DECISION-FEEDBACK EQUALIZER WITH MAXIMUM-LIKELIHOOD SEQUENCE ESTIMATION AND ASSOCIATED METHODS

(75) Inventors: Roy Baxter Blake, Denville, NJ (US); Jianqing Lin, Pleasanton, CA (US); Chun Wang, Fremont, CA (US)

(73) Assignee: Agere Systems Inc., Allentown, PA (US)

( * ) Notice: Subject to any disclaimer, the term of this patent is extended or adjusted under 35 U.S.C. 154(b) by 688 days.

(21) Appl. No.: 09/630,263

(22) Filed: Aug. 1, 2000

Related U.S. Application Data

(60) Provisional application No. 60/151,696, filed on Aug. 31, 1999.

(51) Int. Cl.[7] ................................................. H03H 7/30
(52) U.S. Cl. ...................................................... 375/233
(58) Field of Search ................................. 375/229, 232, 375/235, 233; 333/18, 28 R; 708/300, 301, 322, 323

(56) References Cited

U.S. PATENT DOCUMENTS

| | | | | |
|---|---|---|---|---|
| 5,020,078 A | 5/1991 | Crespo | ....................... | 375/12 |
| 5,283,811 A | 2/1994 | Chennakeshu et al. | ....... | 375/14 |
| 5,353,307 A | 10/1994 | Lester et al. | .................. | 375/14 |
| 5,432,821 A | 7/1995 | Polydoros et al. | .......... | 375/340 |
| 5,673,294 A | 9/1997 | Namekata | .................... | 375/341 |
| 5,930,296 A | * 7/1999 | Kot | ............................. | 375/233 |
| 5,963,599 A | 10/1999 | Curtis et al. | ................. | 375/341 |
| 6,470,047 B1 | * 10/2002 | Kleinerman et al. | ........ | 375/232 |

FOREIGN PATENT DOCUMENTS

| | | | | |
|---|---|---|---|---|
| GB | 2-355-903 | * | 2/2001 | |
| WO | 99/49586 | | 9/1999 | ............ H04B/7/00 |

* cited by examiner

*Primary Examiner*—Tesfaldet Bocure
(74) *Attorney, Agent, or Firm*—William H. Bollman

(57) ABSTRACT

A Decision-Feedback Equalizer (DFE) includes a Maximum Likelihood Sequence Estimator (MLSE) for estimating a symbol sequence. The DFE also includes a signal level decoder, and a delay line having a first plurality of taps being connected to the output of the signal level decoder, and a second plurality of taps being connected to the output of the MLSE. Furthermore, the DFE has an error signal generator having a first input connected to the input of the signal level decoder, and a second input connected to the output of the signal level decoder for adjusting coefficients of the taps. The symbol delay line has been split into two sections with the output of the MLSE being fed to part of the delay line. Because symbols in the delay line are adjusted with the coefficients and feedback to the signal level decoder, the output of the MLSE is able to correct symbols whenever its output is available. In such a symbol updating approach, error propagation in the delay line is avoided during an error event.

27 Claims, 2 Drawing Sheets

DECISION-FEEDBACK EQUALIZER WITH MAXIMUM-LIKELIHOOD SEQUENCE ESTIMATION AND ASSOCIATED METHODS

This application claims the benefit of provisional application Ser. No. 60/151,696 filed Aug. 31, 1999.

FIELD OF THE INVENTION

The present invention relates to digital communications, and more particularly, to Decision-Feedback Equalization (DFE) and Maximum-Likelihood-Sequence-Estimation (MLSE) in a digital receiver.

BACKGROUND OF THE INVENTION

Digital communication systems, such as standard telephone twisted pair loops or wireless radio communication systems, are used to convey a variety of information between multiple locations. With digital communications, information is translated into a digital or binary form, referred to as bits, for communication purposes. A pair of binary bits form a symbol. A transmitter maps the bit stream into a modulated symbol stream, converts the modulated symbol stream to a signal and transmits the signal. A digital receiver receives the signal, down converts the signal to a low frequency signal, samples the low frequency signal and maps the sampled signal back into an estimate of the information.

The communication environment presents many difficulties that effect communications. For example, dispersion occurs, wherein crosstalk or other noise disturbances may give rise to signal errors. To reduce the errors, it is known that a Maximum-Likelihood-Sequence-Estimation (MLSE) equalizer may be employed. Such an equalizer considers various hypotheses for the transmitted symbol sequence, and, with a model of the dispersive channel, determines which hypothesis best fits the received data. This can be realized using the Viterbi Algorithm. This equalization technique is well-known to those skilled in the art, and can be found in standard text books such as J. G. Proakis, Digital Communications, 2d ed., NY: McGraw-Hill, chapter 6, 1989.

A receiver is described in an article in IEEE Transactions on Information Theory, January 1973, pages 120–124, F. R. Magee, Jr. and J. G. Proakis: "Adaptive Maximum-Likelihood Sequence estimation for Digital Signaling in the presence of Intersymbol Interference". The article describes a channel equalizer which includes a viterbi analyzer having an adaptive filter as a channel estimating circuit. Received symbols are compared successively with hypothetical symbols and those hypothetical symbols which coincide closest with the received symbols are selected successively to form an estimated symbol sequence. The parameters of the adaptive filter are adjusted successively to the changed channel, with the aid of the selected, decided symbols. A description of the viterbi algorithm is given in an article by G. David Forney, Jr.: "The Viterbi Algorithm" in Proceedings of the IEEE, Vol. 61, No. 3, March 1973. The article also describes in some detail the state and state transitions of the Viterbi algorithm and also how these state transitions are chosen to obtain the most probable sequence of symbols.

However, the MLSE equalizer is highly complex because, for example, the MLSE equalizer is based upon the assumption that symbol interference extends over the entire transmitted message and that the communication channel varies with time. Thus, implementation of the MLSE is expensive, requires a lot of hardware and/or software resources, and is power-consuming. Accordingly, a decision feedback equalizer (DFE) is known as an alternative to the MLSE. DFE arrangements are advantageous in that they exhibit low computational complexity. U.S. Pat. No. 5,353,307 to Lester et al. and other publications disclose adaptive equalizers for simulcast receivers that employ Lattice-DFE and Kalman-DFE techniques.

Hybrid arrangements that combine various equalization techniques have also been proposed. For example, an article by W. U. Lee and F. S. Hill, Jr.: "A Maximum-Likelihood Sequence Estimator with Decision-Feedback Equalization," in IEEE transactions on communications, September 1977, proposes a DFE as a pre-filter which limits the complexity of a MLSE implemented by the Viterbi algorithm for channels having a long impulse response. However, the proposed scheme has a disadvantage of feeding the DFE with slicer output. This may cause error propagation in the delay line and affect the performance of the MLSE.

SUMMARY OF THE INVENTION

In view of the foregoing background, it is therefore an object of the invention to improve the performance of a decision-feedback equalizer (DFE) by reducing error propagation in the delay line.

This and other objects, features and advantages in accordance with the present invention are provided by a DFE including a first summing node having a first input for receiving an input signal, a second input for receiving a second feedback signal, and an output. A maximum likelihood sequence estimator (MLSE) for estimating a symbol sequence has an input connected to the output of the first summing node, and has an output. A second summing node has a first input connected to the output of the first summing node, a second input for receiving a first feedback signal, and an output. The DFE also includes a signal level decoder having an input connected to the output of the second summing node, and a delay line. The delay line includes a first plurality of taps being connected to the output of the signal level decoder, and generating respective first tap signals based upon respective first coefficients, and a second plurality of taps being connected to the output of the MLSE, and generating respective second tap signals based upon respective second coefficients. Furthermore, the DFE has a first summing circuit for summing the first tap signals to generate the first feedback signal, a second summing circuit for summing the second tap signals to generate the second feedback signal, and an error signal generator having a first input connected to the input of the signal level decoder, and a second input connected to the output of the signal level decoder for adjusting the first and second coefficients.

The MLSE preferably has a partial output, and the delay line further comprises a third tap connected to the partial output of the MLSE. The partial output of the MLSE outputs a partially estimated signal based upon the estimated symbol sequence. The third tap generates a third tap signal based upon a third coefficient, and the first summing circuit may sum the first and third tap signals to generate the first feedback signal. Also, the MLSE preferably estimates the symbol sequence based upon the M-algorithm.

Objects, features and advantages in accordance with the present invention are also provided by a method of estimating symbol sequences of an input signal comprising a plurality of symbols. The method includes summing an input signal and a second feedback signal to generate a first summed signal, and summing the first summed signal with a first feedback signal to generate a second summed signal.

The second summed signal is level decoded to generate a decoded signal, and respective first tap signals are generated from the decoded signal based upon respective first coefficients. Also, the first tap signals are combined to form the first feedback signal. Second tap signals are generated from a symbol output signal based upon respective second coefficients, and the second tap signals are combined to form the second feedback signal. A maximum likelihood sequence estimation is performed for estimating a symbol sequence of the first summed signal to provide the symbol output signal.

Also, an error signal may be generated based upon the second summed signal and the decoded signal for adjusting the first and second coefficients. Furthermore, performing the maximum likelihood sequence estimation may comprise generating a partial output signal, and a third tap signal may be generated from the partial output signal based upon a third coefficient. The partial output signal comprises a partially estimated signal based upon the estimated symbol sequence. Here, the sum of the first and third tap signals forms the first feedback signal. Moreover, the maximum likelihood sequence estimation is preferably based upon the M-algorithm.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
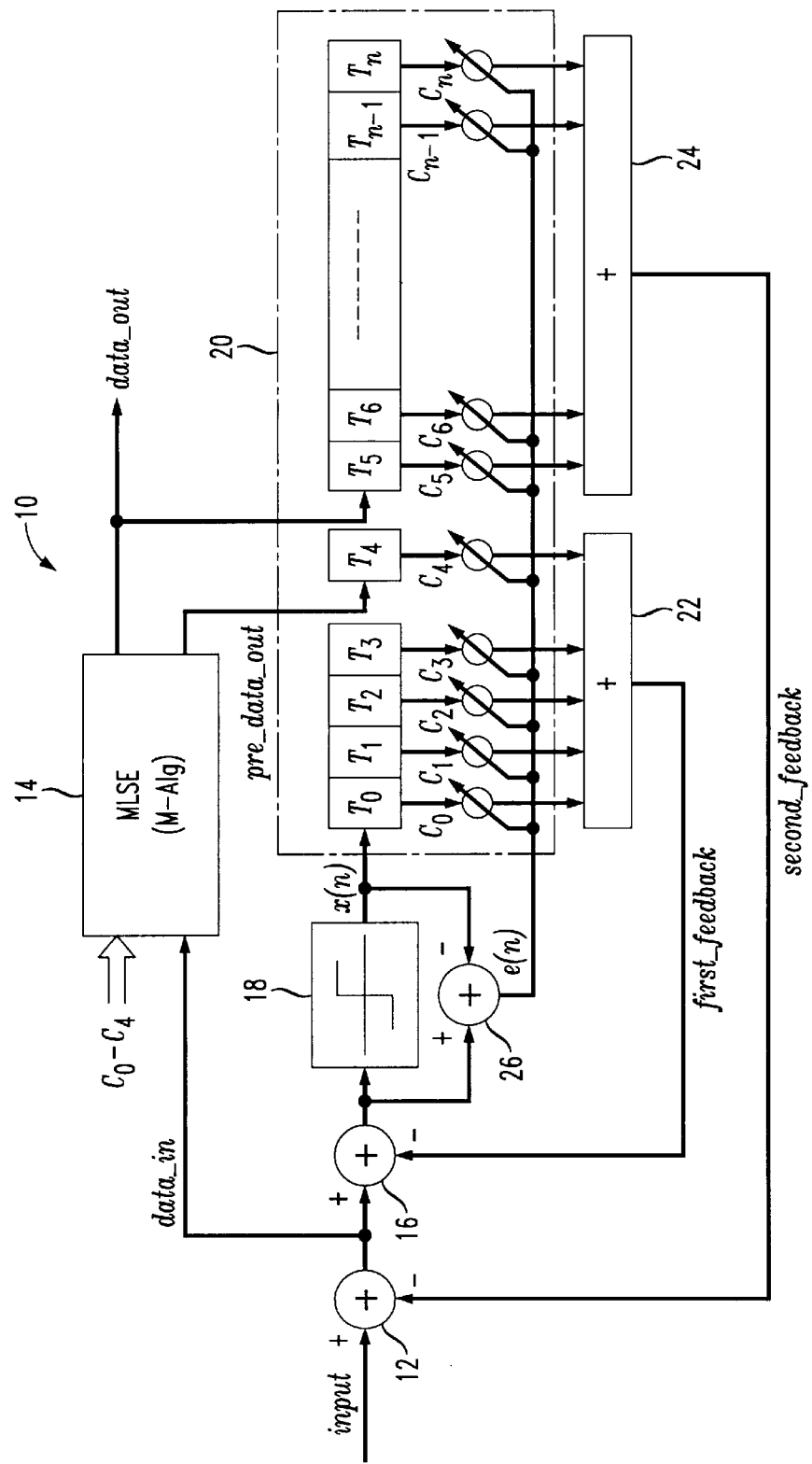
FIG. 1 is a schematic diagram illustrating a DFE in accordance with the present invention.

Referring to FIG. 1, the Decision-Feedback Equalizer (DFE) 10 in accordance with the present invention will be described. The DFE 10 includes a first summing node 12 having a first input (+) for receiving an input signal, a second input (−) for receiving a second feedback signal second_feedback, and an output. A maximum likelihood sequence estimator (MLSE) 14 for estimating a symbol sequence has an input connected to the output of the first summing node 12 and receives the signal data_in. A second summing node 16 has a first input (+) connected to the output of the first summing node 12, a second input (−) for receiving a first feedback signal first feed_back, and an output.

The DFE 10 also includes a signal level decoder 18 having an input connected to the output of the second summing node 16, and a delay line 20. The signal level decoder 18 or slicer is preferably a 4-level pulse amplitude modulation system (PAMS) for determining whether the signal is at one of four levels, e.g. plus or minus 1, and plus or minus 3, as would be readily appreciated by the skilled artisan. The delay line 20 includes a first plurality of taps $T_0$–$T_3$ being connected to the output of the signal level decoder 18, and generating respective first tap signals based upon respective first coefficients $C_0$–$C_3$. Also, the delay line 20 includes a second plurality of taps $T_5$–$T_n$ being connected to the output of the MLSE, and generating respective second tap signals based upon respective second coefficients $C_5$–$C_n$. Of course any number of taps T may be used based upon the requirements of a particular system; however, the use of four taps $T_0$–$T_3$ connected to the output of the signal level decoder 18 has been found to be optimal in terms of performance, cost and benefit.

Furthermore, the DFE 10 has a first summing circuit 22 for summing the first tap signals to generate the first feedback signal first_feedback, and a second summing circuit 24 for summing the second tap signals to generate the second feedback signal second_feedback. An error signal generator 26 has a first input (+) connected to the input of the signal level decoder 18, and a second input (−) connected to the output of the signal level decoder for adjusting the first and second coefficients $C_0$–$C_n$.

The MLSE 14 preferably has a partial output for outputting a partially estimated signal pre_data_out based upon the estimated symbol sequence. Note that the delay line 20 may further include a third tap $T_4$ connected to the partial output of the MLSE 14. The third tap generates a third tap signal based upon a third coefficient $C_4$, and the first summing circuit 22 sums the first and third tap signals to generate the first feedback signal first_feedback.

Also, the MLSE 14 preferably estimates the symbol sequence based upon the M-algorithm and may receive the coefficients $C_0$–$C_4$ from the first plurality of taps $T_0$–$T_3$ and the third tap $T_4$. The M algorithm is described in an article by V. Joshi and D. Falconer entitled "Sequence Estimation Techniques for Digital Subscriber Loop Transmission with Crosstalk interference" in IEEE Transactions on Communications, Vol. 38, No. 9, September 1990. Additionally, the M algorithm is described in an article by J. Anderson and S. Mohan entitled "Sequential Coding Algorithms: A Survey and Cost Analysis" in IEEE Transactions on Communications, Vol. 32, No. 2, February 1984. Of course other known algorithms may be used in the MLSE 14; but, better performance has been achieved thus far with the M algorithm.

As is apparent from the above description and from FIG. 1, the symbol delay line 20 has been split into two sections with the output data_out of the MLSE being fed to part of the delay line. Because symbols in the delay line 20 are adjusted with the coefficients $C_0$–$C_n$, and fedback (i.e. first_feedback and second_feedback) to the signal level decoder 18, the output of the MLSE 14 is able to correct symbols whenever its output is available. In such a symbol updating approach, error propagation in the delay line 20 is avoided during an error event.

Figure 2:
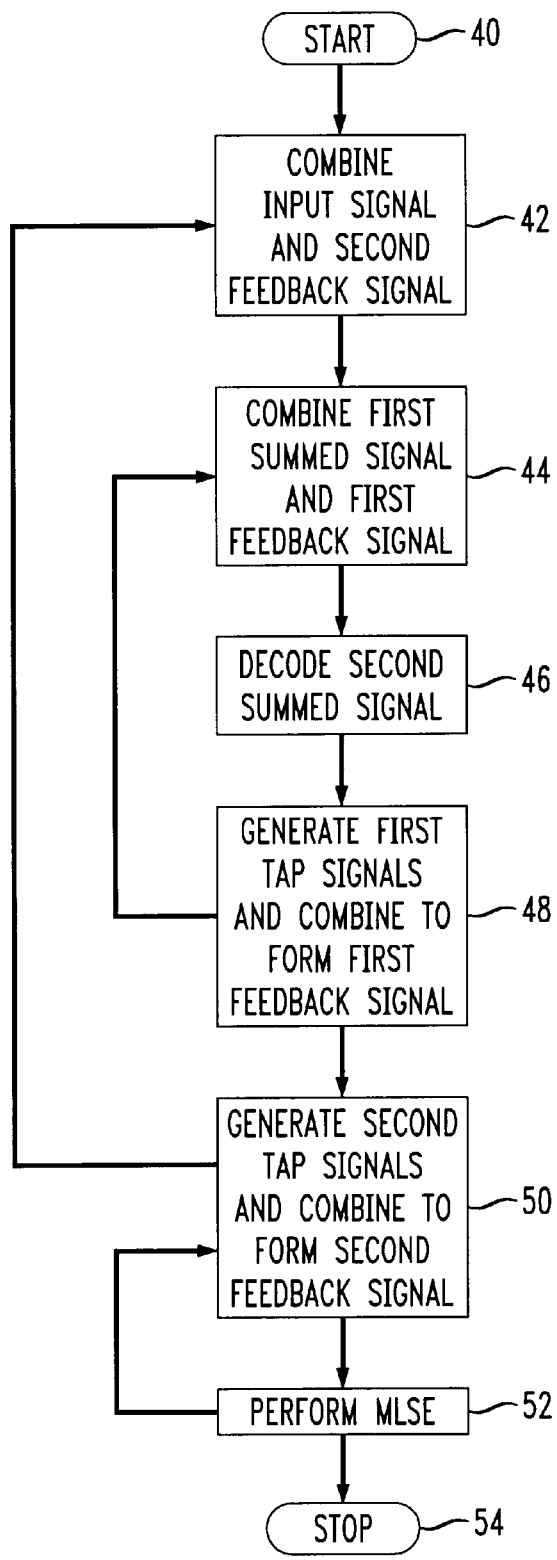
FIG. 2 is a flowchart illustrating the method steps in accordance with the present invention.

Referring now to FIG. 2, a method of estimating symbol sequences of an input signal comprising a plurality of symbols will now be described. The method begins (block 40) and includes summing the input signal and the second feedback signal second_feedback to generate a first summed signal at block 42. The first summed signal is combined with a first feedback signal first_feedback to generate a second summed signal at block 44. The second summed signal is level decoded (block 46) via the signal level decoder 18 to generate a decoded signal. At block 48, respective first tap signals are generated from the decoded signal based upon the respective first coefficients $C_0$–$C_3$. Also, the first tap signals are combined to form the first feedback signal first_feedback which is used in the combining step at block 44. Second tap signals are generated (block 50) from the symbol output signal data-out based upon respective second coefficients $C_5$–$C_n$, and the second tap signals are combined to form the second feedback signal second_feedback which is used in the combining step at block 42. At block 52, a maximum likelihood sequence estimation is performed for estimating a symbol sequence of the first summed signal to provide the symbol output signal data_out which fed back to the delay line 20 to generate the second tap signals at block 50.

Also, an error signal may be generated based upon the second summed signal and the decoded signal for adjusting the first and second coefficients $C_0$–$C_n$. Furthermore, performing the maximum likelihood sequence estimation may comprise generating the partial output signal pre_data_out. Here, a third tap signal may be generated from the partial output signal pre_data_out based upon a third coefficient $C_4$. As discussed above, the partial output signal pre_data_out comprises a partially estimated signal based upon the estimated symbol sequence. Here, the sum of the first and third tap signals forms the first feedback signal first_feedback. Again, the maximum likelihood sequence estimation is preferably based upon the M-algorithm.

Because the output of the MLSE 14 is fed into the delay line 20 according to the proper delays of the particular algorithm (e.g. the M algorithm), error propagation is reduced or prevented and the overall performance of a receiver can be improved.

Many modifications and other embodiments of the invention will come to the mind of one skilled in the art having the benefit of the teachings presented in the foregoing descriptions and the associated drawings. Therefore, it is understood that the invention is not to be limited to the specific embodiments disclosed, and that modifications and embodiments are intended to be included within the scope of the appended claims.

That which is claimed is:

1. A decision feedback equalizer (DFE) comprising:
    a first summing node having a first input for receiving an input signal, a second input for receiving a second feedback signal, and an output;
    a maximum likelihood sequence estimator (MLSE) for estimating a symbol sequence and having an input connected to the output of the first summing node, and having an output;
    a second summing node having a first input connected to the output of the first summing node, a second input for receiving a first feedback signal, and an output;
    a signal level decoder having an input connected to the output of the second summing node, and having an output;
    a delay line comprising
        a first plurality of taps being connected to the output of the signal level decoder, and generating respective first tap signals based upon respective first coefficients, and
        a second plurality of taps being connected to the output of the MLSE, and generating respective second tap signals based upon respective second coefficients;
    a first summing circuit for summing the first tap signals to generate the first feedback signal;
    a second summing circuit for summing the second tap signals to generate the second feedback signal; and
    an error signal generator having a first input connected to the input of the signal level decoder, and a second input connected to the output of the signal level decoder for adjusting the first and second coefficients.

2. The DFE according to claim 1 wherein the MLSE has a partial output; and wherein the delay line further comprises a third tap connected to the partial output of the MLSE.

3. The DFE according to claim 2 wherein the partial output of the MLSE outputs a partially estimated signal based upon the estimated symbol sequence.

4. The DFE according to claim 2 wherein the third tap generates a third tap signal based upon a third coefficient; and wherein the first summing circuit sums the first and third tap signals to generate the first feedback signal.

5. The DFE according to claim 4 wherein the MLSE receives the first and third coefficients.

6. The DFE according to claim 1 wherein the MLSE receives the first coefficients.

7. The DFE according to claim 1 wherein the MLSE estimates the symbol sequence based upon the M-algorithm.

8. The DFE according to claim 1 wherein the second input of the first summing node comprises an inverted input.

9. The DFE according to claim 1 wherein the second input of the second summing node comprises an inverted input.

10. The DFE according to claim 1 wherein the second input of the error signal generator comprises an inverted input.

11. The DFE according to claim 1 wherein the signal level decoder comprises a pulse amplitude modulation system (PAMS).

12. The DFE according to claim 9 wherein the PAMS comprises a 4-level PAMS.

13. A decision feedback equalizer (DFE) comprising:
    a first summing node for receiving an input signal and a second feedback signal;
    a maximum likelihood sequence estimator (MLSE) connected to an output of the first summing node for estimating a symbol sequence;
    a second summing node connected to the output of the first summing node and for receiving a first feedback signal;
    a signal level decoder connected to the second summing node; and
    a delay line comprising
        a first plurality of taps being connected to the signal level decoder, and generating respective first tap signals based upon respective first coefficients, a sum of the first tap signals forming the first feedback signal, and
        a second plurality of taps being connected to the MLSE, and generating respective second tap signals based upon respective second coefficients, a sum of the second tap signals forming the second feedback signal.

14. The DFE according to claim 13 further comprising an error signal generator connected to the input and the output of the signal level decoder for adjusting the first and second coefficients.

15. The DFE according to claim 13 further comprising:
    a first summing circuit for summing the first tap signals to generate the first feedback signal; and
    a second summing circuit for summing the second tap signals to generate the second feedback signal.

16. The DFE according to claim 13 wherein the MLSE has a partial output; and wherein the delay line further comprises a third tap connected to the partial output of the MLSE.

17. The DFE according to claim 16 wherein the partial output of the MLSE outputs a partially estimated signal based upon the estimated symbol sequence.

18. The DFE according to claim 16 wherein the third tap generates a third tap signal based upon a third coefficient; and wherein a sum of the first and third tap signals forms the first feedback signal.

19. The DFE according to claim 18 wherein the MLSE receives the first and third coefficients.

20. The DEE according to claim 13 wherein the MLSE estimates the symbol sequence based upon the M-algorithm.

21. A method of estimating symbol sequences of an input signal comprising a plurality of symbols, the method comprising:

summing an input signal and a second feedback signal to generate a first summed signal;

summing the first summed signal with a first feedback signal to generate a second summed signal;

level decoding the second summed signal to generate a decoded signal;

generating respective first tap signals from the decoded signal based upon respective first coefficients;

summing the first tap signals to form the first feedback signal;

generating respective second tap signals from a symbol output signal based upon respective second coefficients;

summing the second tap signals to form the second feedback signal; and performing a maximum likelihood sequence estimation for estimating a symbol sequence of the first summed signal to provide the symbol output signal.

22. The method according to claim 21 further comprising generating an error signal based upon the second summed signal and the decoded signal for adjusting the first and second coefficients.

23. The method according to claim 21 wherein performing the maximum likelihood sequence estimation comprises generating a partial output signal; and further comprising generating a third tap signal from the partial output signal based upon a third coefficient.

24. The method according to claim 23 wherein the partial output signal comprises a partially estimated signal based upon the estimated symbol sequence.

25. The method according to claim 23 wherein a sum of the first and third tap signals forms the first feedback signal.

26. The method according to claim 23 wherein the maximum likelihood sequence estimation uses the first and third coefficients.

27. The method according to claim 21 wherein the maximum likelihood sequence estimation is based upon the M-algorithm.

* * * * *